United States Patent [19]
Jensen

[11] 3,900,869
[45] Aug. 19, 1975

[54] RADAR SIGNAL ANALYZING SYSTEM
[75] Inventor: Garold K. Jensen, Alexandria, Va.
[73] Assignee: The United States of America as represented by the Secretary of the Navy, Washington, D.C.
[22] Filed: June 27, 1967
[21] Appl. No.: 650,157

[52] U.S. Cl. .............................................. 343/7.7
[51] Int. Cl.² ........................................... G01S 9/42
[58] Field of Search ................................. 343/7.7, 9

[56] References Cited
UNITED STATES PATENTS
3,127,607  3/1964  Dickey, Jr. ..................... 343/7.7 X

*Primary Examiner*—Malcolm F. Hubler
*Attorney, Agent, or Firm*—R. S. Sciascia; Arthur L. Branning

[57] ABSTRACT

A storage type phase-coherent pulse-doppler radar system wherein return signals containing doppler information from a plurality of ranges are stored and then analyzed to determine the velocity and acceleration of the target. Each of the signals is heterodyned with a variable frequency and the difference frequency is presented to a narrow pass filter. The variable frequency is varied stepwise as well as continuously over the expected range of received doppler frequencies and the filter produces an output signal only when the difference frequency falls within a narrow range. This output signal is stored in a memory device and its storage position indicates the velocity and acceleration of the target.

11 Claims, 8 Drawing Figures

INVENTOR
GAROLD K. JENSEN

INVENTOR
GAROLD K. JENSEN

INVENTOR
GAROLD K. JENSEN

BY *Kenneth C. Jacobs* AGENT
*R. S. Sciascia* ATTORNEY

RADAR SIGNAL ANALYZING SYSTEM

The invention described herein may be manufactured and used by or for the Government of the United States of America for governmental purposes without payment of any royalties thereon or therefor.

BACKGROUND OF THE INVENTION

The present invention relates to a radar signal processing system and more particularly to a phase-coherent pulse-doppler system wherein stored return signals are analyzed for doppler frequency as well as rate of change of doppler frequency.

Copending application Ser. No. 649,791 filed concurrently herewith by the present inventor discloses a radar system wherein a plurality of returned echoes resulting from a plurality of transmitted pulses are stored and then played back in rapid succession so that the doppler information may be recovered. The returned signals from each range interval are stored in separate storage devices so that the signals from targets at the various ranges may be separately analyzed. The present application discloses an analysis system which may be used to analyze the signals stored and reproduced according to the above mentioned copending application. Of course, the analyzer has wider application and may be used with other types of radar systems.

Accelerating targets, such as missiles, spread their echo energy over many velocity bins of a velocity analyzing and integrating radar, with the consequent loss of system sensitivity (signal amplitude) and velocity resolution. An attempt to circumvent this problem by increasing the bandwidth of the analysis narrow-band filtering will result in a lowered velocity resolution and system sensitivity. The aim of the present invention is to solve this problem (and at the same time acquire the acceleration parameter), not by widening the velocity filtering, but by employing spectrum compression techniques to collect the spread spectrum energy of the accelerating target into the same narrow frequency band of a nonaccelerating target. This invention not only permits the greatest possible acceleration, velocity, and range resolution, but it also provides a signal with as great an amplitude as the original constant velocity case. Acceleration, as an additional dimension of information, is realized in the spectral compression operation when the target acceleration is determined by a doppler-profile matching process. It should be pointed out that the spectrum compression or profile matching process of the acceleration gate system also permits the use of very narrow analysis bandwidths, which are necessary for long integration periods. In turn, the increased integration periods result in increased resolution and an increased output signal-to-noise ratio or system sensitivity. According to the present invention the extra dimension of information (acceleration) is obtained in the same analysis time period as was previously required for only velocity and range information.

SUMMARY OF THE INVENTION

The general purpose of this invention is to provide a radar signal processing system which embraces all the advantages of prior art systems and possesses none of the aforedescribed disadvantages.

According to the present invention the return signals containing doppler information from each range interval are temporarily stored in separate storage means and then read out repeatedly in order to determine the velocity and acceleration of the targets detected. Before storage occurs the returned radar pulses are mixed with coherent local frequencies to produce a series of video pulses whose amplitude envelope varies with the doppler frequency. The video signals resulting from returns from a plurality of transmitted pulses are sampled at intervals depending upon the range resolution desired and a plurality of these samples from each range interval is stored. These signals are read out over a plurality of channels, one for each range interval, with the signals from each range being read out in rapid succession. In order to detect the frequency of the amplitude envelope of the pulses they are mixed with a local frequency which is systematically varied over the expected doppler frequency range. The output from this mixing process is applied to a narrow pass filter so that an output is obtained only when the doppler frequency bears a given relationship to the local frequency. Target velocity and acceleration are both determined by discretely stepping the local frequency across the doppler range as well as continuously increasing or decreasing the local frequency to match expected acceleration or deceleration profiles.

Only one local frequency generator is necessary and its output is supplied in parallel to a plurality of mixers corresponding to the plurality of range channels. By repeatedly reading out the stored signals they can be mixed with a different fixed frequency or frequency sweep during each readout and the narrow pass filter will transmit a signal whenever the difference frequency is within a narrow range. By observing the time when the filter passes a signal it is possible to determine both the velocity and the acceleration of the target. Synchronizing means are included so that each frequency sweep is arranged to begin with the readout of the oldest stored signal and end with the readout of the most recently stored signal.

An object of the present invention is provision of a radar signal analysis system which repeatedly compares a stored sequence of signals with a series of fixed and variable frequencies to determine the frequency pattern of the stored sequence of signals.

Another object is to analyze the stored signals from a plurality of range intervals in parallel channels with one channel for each range interval.

A further object of the invention is to simultaneously analyze the signals in all the range channels.

Still another object of the invention is to obtain the analysis output as a signal whose time position with respect to be analysis sequence indicates the velocity and acceleration of the target being detected.

BRIEF DESCRIPTION OF THE DRAWINGS

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGS. 3(b) and (c) show frequency signals corresponding to an accelerating target and a constant velocity target respectively;

FIG. 3(d) shows the output signal from an analyzing channel which had the frequencies of FIGS. 3(a), (b) and (c) as inputs;

DESCRIPTION OF THE PREFERRED EMBODIMENTS

Figure 1:
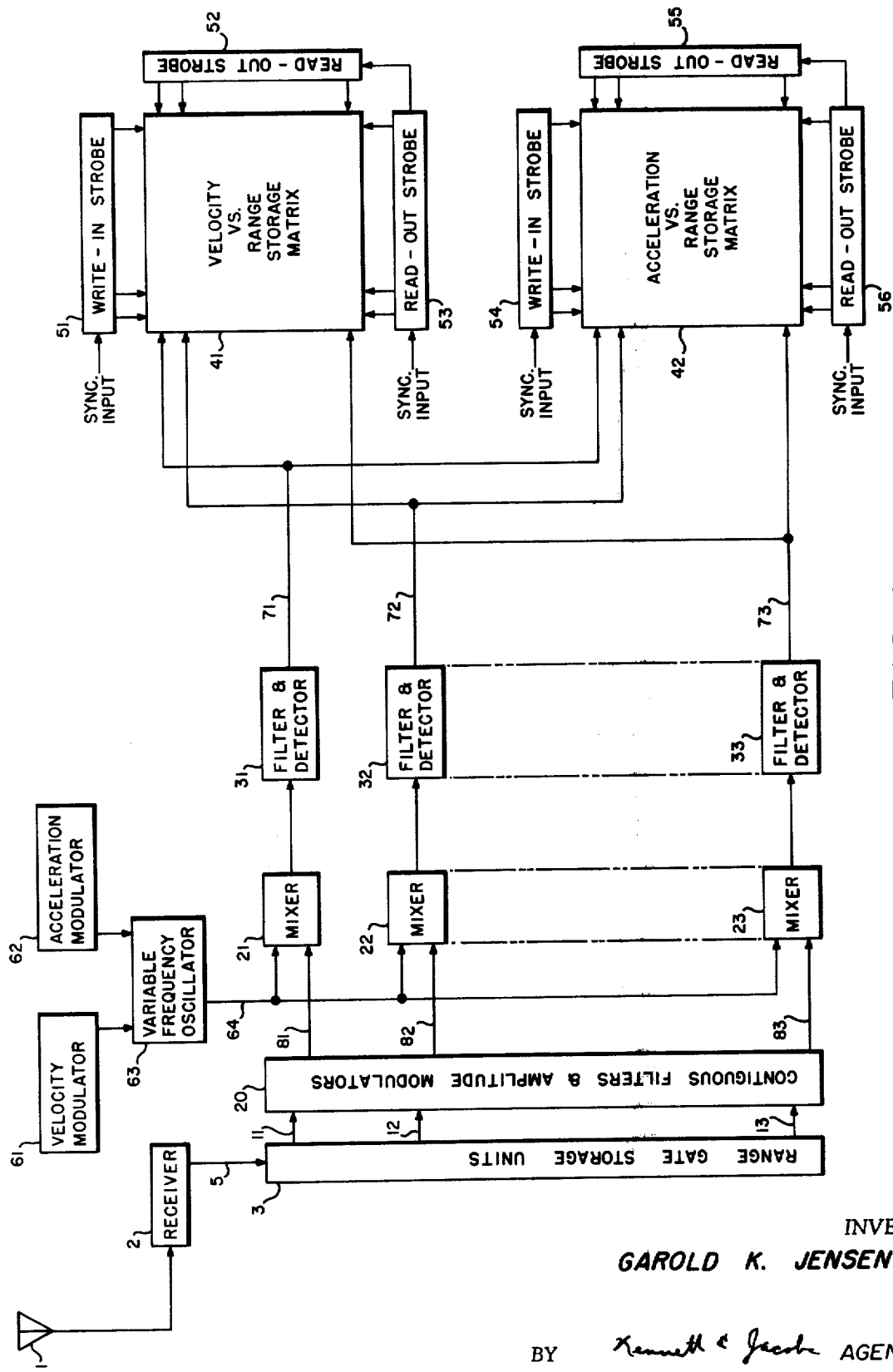
FIG. 1 shows a block diagram of a system embodying the invention.

A simplified block diagram of a system including the present invention is shown in FIG. 1. This figure shows the receiving and signal processing portion of a radar system which is based on the pulse-doppler principle, wherein short phase-coherent pulses of r-f energy are transmitted by a transmitter (not shown) and the echoes are received by antenna 1. As explained in detail in the above-mentioned copending application Ser. No. 649,791 the returned pulse signals are mixed with a coherent stable frequency or frequencies in a manner to produce video pulses whose amplitude envelope varies with the doppler frequency of the returned signals. These video signals are sampled and separated according to the range interval from which they were derived and temporarily stored in range gate storage units 3. These storage units are capable of storing all the returned information over a period of several seconds with the newest information continuously replacing the oldest stored information. The information samples from each range interval are repeatedly read out at a fast rate over the respective lines 11, 12, 13, etc. and fed through a plurality of contiguous filters included in block 20 which serve to improve the signal-to-noise ratios of the signals. The outputs of these filters are applied over lines 81, 82, 83, etc. to the portion of the signal processor where both a velocity and an acceleration analysis of signals in all range channels is performed. In one preferred embodiment of the system ten range channels are provided and each channel will receive input signals from the signal storage unit of the corresponding range. Of course, the number of range channels could be different from ten.

Signals, which are written into the storage units over a period equal to the storage time, are repetitively read out at a much higher rate in order to perform the full velocity and acceleration analysis in real time. Doppler frequencies, whose maximum unambiguous value when written into the memory is the pulse repetition frequency divided by two will be multiplied by a factor equal to the ratio of the readout rate to the write-in rate. For example, at a PRF of 90 cps the maximum unambiguous doppler frequency is 45 cps. If a storage time of 10 seconds and a readout time of 120 microseconds are selected, the maximum unambiguous multiplied doppler frequency becomes approximately 3.75 Mc (i.e., 45 10 divided by 0.000120).

Velocity analysis is performed by mixing the multiplied doppler frequency with a locally generated frequency which is varied in steps across the entire possible unambiguous multiplied doppler range and then determining the amplitude of the resultant signal which passes through a narrow band pass filter. In FIG. 1 this mixing is done in mixers 21, 22, 23, etc. and the narrow band filtering is accomplished by blocks 31, 32, 33, etc. The variable frequency for mixing is supplied simultaneously to all the mixers from modulated oscillator 63 so that the velocity analysis of all range channels is accomplished simultaneously and the outputs are presented in parallel. The successive steps of the variable frequency are normally less than the bandwidths of the filters in order to provide some overlap and avoid losses that could otherwise occur at band edges. As will be explained in more detail below the stepping of oscillator 63 across the possible doppler range is carried out by velocity modulator 61.

Acceleration analysis may be performed with the same set of analyzers by using acceleration modulator 62 to sweep the local oscillator to match expected changes in target radial velocity. This analysis is required whenever the radial velocity variation during the memory write-in time exceeds the velocity resolution bandwidth. This effect not only occurs when the target is actually accelerating but also when a constant velocity target is in the process of changing its direction such as occurs with an aircraft performing a normal turn. When this occurs the energy in the signal return is spread over a range of doppler frequencies with a corresponding reduction in the total energy that falls within a velocity resolution bandwidth. Losses in signal-to-noise ratios may be in the order of 20 db or more when observing highly accelerating targets such as missiles. Essentially all of this potential loss may be prevented by frequency modulating oscillator 63 to match the change in target radial velocity that occurs during the storage time and thereby spectrally compressing the frequency-spread signal back to within a single velocity resolution bandwidth. With storage times of ten seconds or less and a doppler velocity resolution of approximately ⅜ cps, a linear change of frequency is adequate to match most (but not all) accelerating target returns. Frequency matching to within higher order derivatives of range vs. time (non-linear gates) may be used if deemed necessary.

Since the optimum predetection filter bandwidth is determined by a choice of operating parameters, a selection of several bandwidths should be available and means provided to simultaneously switch the bandwidths of all the analysis channels.

Figure 2:
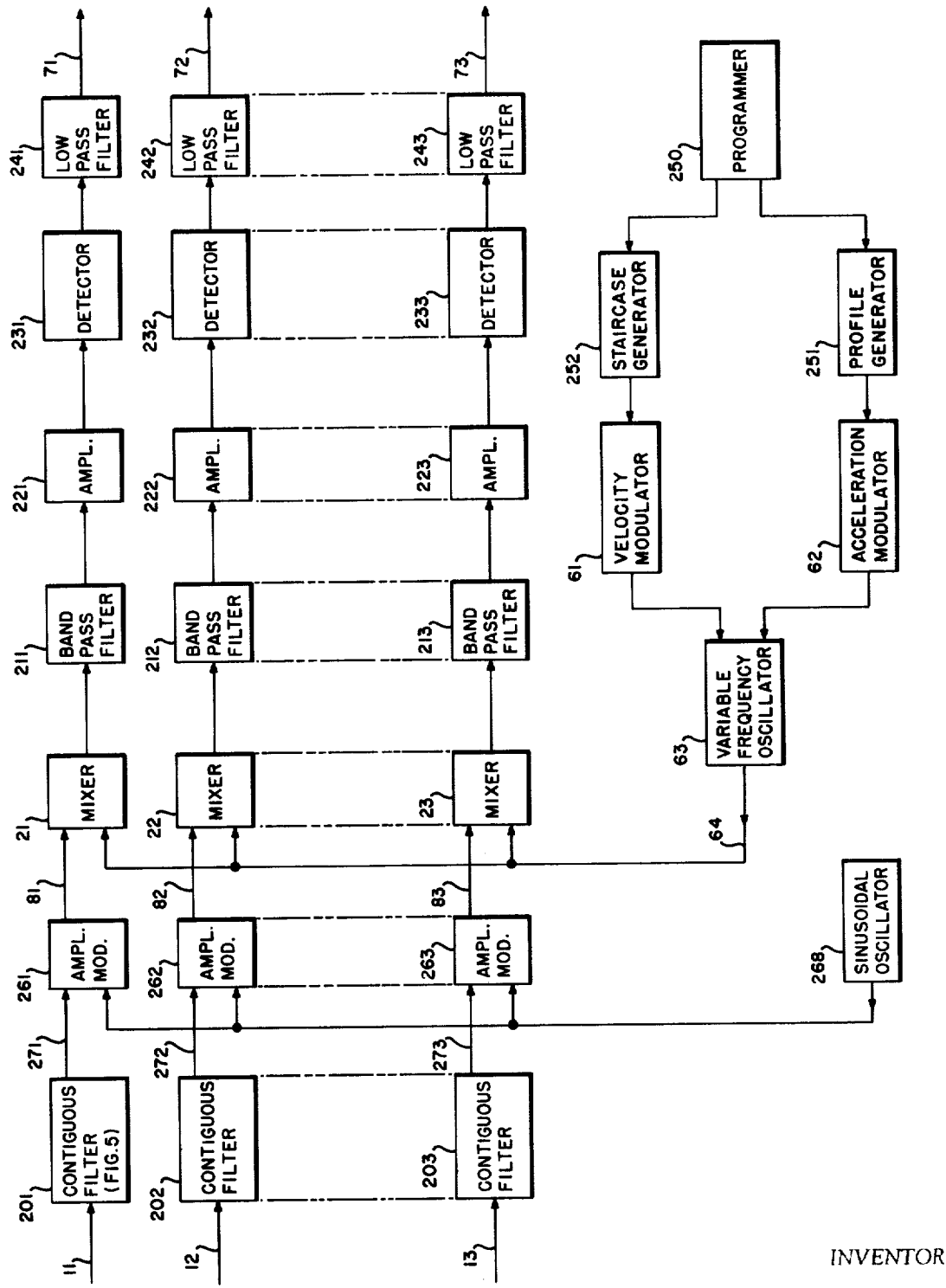
FIG. 2 shows a more detailed block diagram of the analyzer portion of the system of FIG. 1.

The repetitive nature of the readout of the stored information creates a frequency lobe structure by introducing new frequencies into the signal being presented to mixers 21, 22, 23, etc. Thus, if the signals are a series of square pulses containing the multiplied doppler sinusoidal components the actual frequency spectrum of the signal presented to the mixers will contain these multiplied doppler frequency components as well as upper and lower sidebands which are introduced due to the discontinuous nature of the signals. As explained in *Principles of Radar*, Third Edition, 1952, by J. F. Reintjes, et al., pages 341–349, the rectangular pulse shape will introduce a family of frequencies for each of the originally present frequencies and the frequency spectrum envelope of each family of frequencies will have the form of $\sin x/x$. In order to improve the frequency lobe structure of the signals presented to the mixers, the signals may be amplitude weighted over time by multiplying the input signals with a factor which varies over time. For example, the signals on lines 81, 82, 83, etc. may be amplitude weighted by a triangular wave or cosine squared wave before entering mixers 21, 22, 23, etc. Since $2[\cos^2(2\pi ft/2)] = \cos(2\pi ft) + 1$, a cosine squared weighting can be obtained by multiplying the input signal by the function $[\cos(2\pi ft) + 1]$ where $t$ is time and $f$ corresponds to the frequency at which the acceleration modulator produces acceleration profiles. This modulation can be carried out as shown in FIG. 2 by amplitude modulators 261, 262, 263, etc. These modulators are fed by sinusoidal oscillator 268 which supplies a sine wave having a period equal to the readout time for the stored signals. Thus, the signals are changed to a series of a.c. signals whose amplitude envelopes vary smoothly from zero to a maximum and then back to zero. This serves to reduce the undesired side frequencies introduced by the pulsing process.

Figure 3:
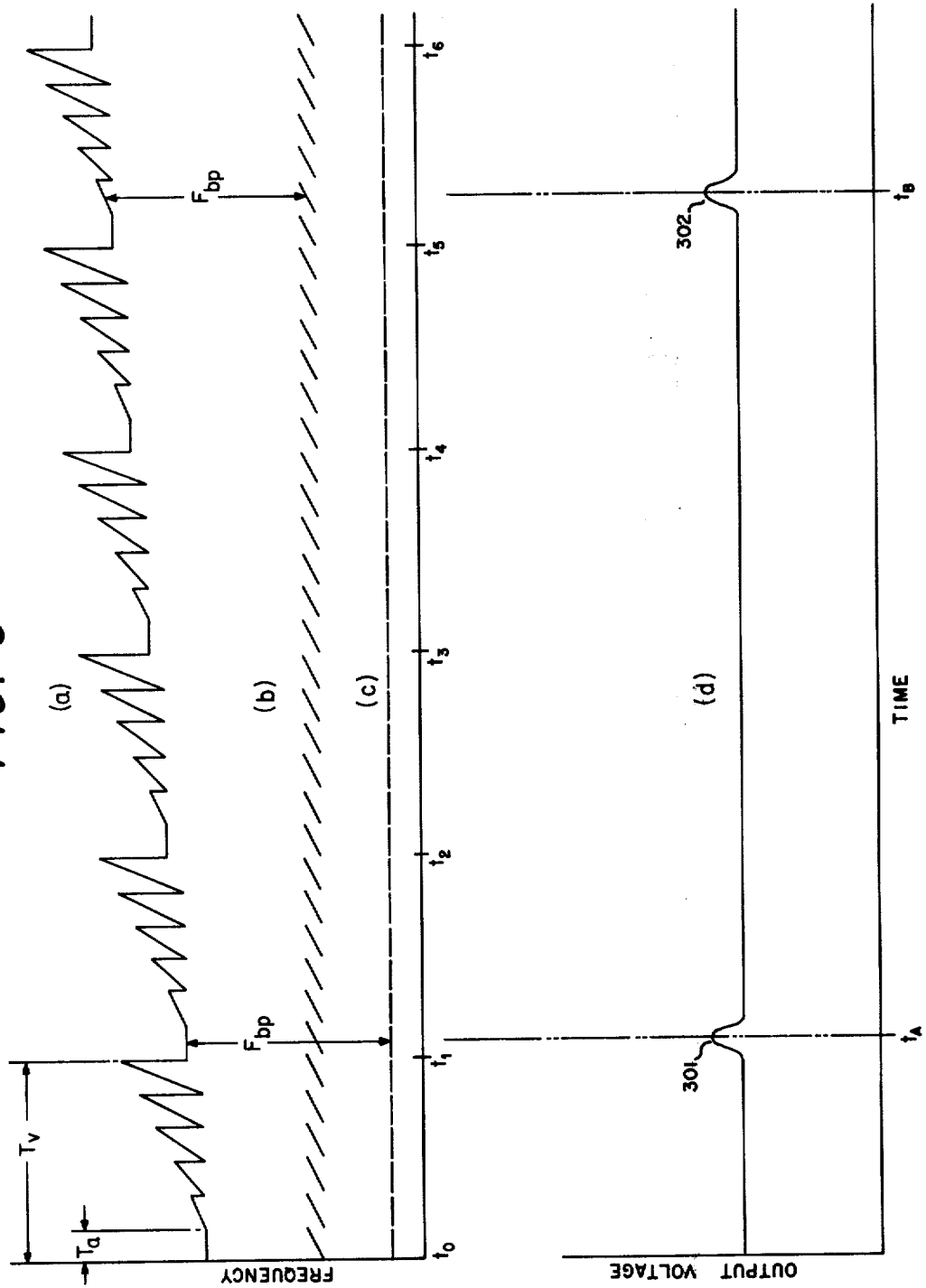
FIG. 3($a$) shows a simplified time diagram of the frequencies generated by the variable frequency oscillator.

In order to analyze the frequencies and rates of change of frequencies of the stored signals, these signals are heterodyned with a series of frequencies in mixers 21, 22, 23, etc. These frequencies are obtained from variable frequency oscillator 63 which is capable of a linear change in frequency vs. modulating voltage for each of two modulation inputs, i.e., the velocity modulation input from modulator 61 and the acceleration modulation input from modulator 62. In normal operation the velocity modulation input will remain fixed in value while the acceleration input is sequentially programmed for all acceleration gates; then the velocity input is stepped one position and the acceleration input is again programmed through all gates. This process is repeated until all dopplers (velocities) up to PRF/2 have been analyzed at all accelerations. A typical time diagram of the output frequency of oscillator 63 is shown in FIG. 3. In this figure each period $T_n$ is equal to the readout time for a stored signal.

The velocity modulation function generated by modulator 61 may be a staircase waveform where the duration of each step will be equal to the product of the number of acceleration gates by the signal memory readout time (which in this case is 120 microseconds); the duration of the entire staircase is equal to the product of the step duration by the number of velocity analysis steps; the total amplitude of the staircase is equal to the voltage required to change the frequency of modulated oscillator 63 by the same amount as the change in the multiplied doppler frequency over the total unambiguous velocity range; and the amplitude of each step is the total staircase voltage divided by the number of velocity analysis steps. Normally, the number of velocity analysis steps will exceed the exact number indicated by total velocity coverage and veloccity resolution bandwidth by a factor of 30 to 50% to avoid the slight losses where the signal velocity occurs midway between consecutive velocity sweeps and would otherwise appear at the edge of the analysis filter bandwidth.

The acceleration modulation may be derived from a sawtooth generator whose period is essentially equal to the signal memory readout time of 120 microseconds ($T_n$). Of course, if targets with non-linear acceleration patterns are expected, the sawtooth can be changed to a non-linear sweep. The sawtooth ramp will occupy a major part of the 120 microseconds leaving just a short flyback time. All information written into the signal memory during the full storage time is readout in the short readout time of 120 microseconds, and the acceleration sawtooth waveform is synchronized so that its onset corresponds in time to the readout of the oldest stored information and the termination of the sawtooth corresponds in time to the readout of the most recent information. The method of synchronization is described below with reference to the memory strobe circuits.

At each successive repeat of the sawtooth waveform its peak amplitude will be uniformly increased (as shown in FIG. 3) until it reaches an amplitude which will produce an oscillator frequency sweep that will match the frequency sweep of the readout signal for the maximum acceleration to be covered. A full set of acceleration sweeps are generated for each step of the velocity modulation.

As can be seen in FIG. 2 the outputs of mixers 21, 22, 23, etc. are fed into predetection band pass filters 211, 212, 213, etc. respectively. Each of these filters passes a signal only if the difference frequency between the two inputs of the respective mixer is within a narrow band corresponding to one velocity bin. This operation can be better understood with reference to FIG. 3 where signal ($a$) shows the frequency of the signal being emitted by variable frequency oscillator 63 on line 64 and signals ($b$) and ($c$) represent the multiplied doppler frequency signals present in the first range gate memory and appearing on line 81. Signals ($b$) and ($c$) could result from two targets having the same range but different velocities and accelerations. As shown, signal ($c$) would represent a constant velocity target while signal ($b$) would represent a higher velocity having a constant acceleration. To simplify the explanation only six velocity gates and six acceleration gates are illustrated in FIG. 3 and only increasing frequency profiles are shown. If both accelerating and decelerating targets were expected, decreasing frequency sweeps would be included. The period $T_n$ is the time for one complete memory readout (in the present example this is 120 microseconds), and during each $T_n$ seconds the stored signal is compared in frequency with a different local frequency as represented by FIG. 3($a$) to determine if the difference frequency will pass through the narrow band filter 211. Thus in the time between $t_o$ and $t_1$ on FIG. 3, six sequential frequency comparisons are made. First the target signal is compared with a constant frequency signal and then it is successively compared with linearly increasing frequencies whose rates of change are stepwise increased. At time $t_1$ the inspection of the first velocity gate has been completed and the inspection of the next higher velocity gate is about to begin. This is accomplished in the same manner as before except all the locally generated frequencies are now shifted upward by a constant amount.

Target signals ($b$) and ($c$) in FIG. 3 are obtained by repeatedly reading out the contents of one range gate memory unit and it can be seen that they differ from signal ($a$) by a certain frequency $F_{bp}$ at certain times during the comparison sequence. If it is assumed that $F_{bp}$ is the frequency which passes through narrow band filter 211 while other difference frequencies are rejected by this filter, the output signal on line 71 will be as shown in FIG. 3($d$). The time positions of the two output pulses 301, 302 indicate in which velocity gates and in which acceleration gate these two targets occur. Referring to FIG. 1 it can be seen how write-in strobes 51 and 54 distribute the signals from the range channels according to time position in the velocity vs. range and acceleration vs. range storage matrices. Other two-dimension storage arrays could be added (such as velocity vs. acceleration), or the target information could be stored in a three dimensional array with all three parameters (i.e., range, velocity, and acceleration) for a given target being indicated by a single storage point. A fourth parameter such a universal time could also be added so that a history of a target's motion could be stored if desired. Patent application Ser. No. 649,792 filed concurrently herewith by the present inventor sets out the details of a data conversion and display system which may be used with the present invention.

In order to properly carry out the comparisons of the readout frequencies such as (b) and (c) in FIG. 3 with the locally generated frequency profiles such as in FIG. 3(a) it is necessary that the local frequency profiles be properly synchronized with the signals derived from the targets. These target signals are temporarily stored in range gate storage units 3 (see FIG. 1) which may comprise a plurality of storage matrices with one matrix for each range interval. Each range gate matrix contains a plurality of storage elements and the sequentially received return signals from a given range interval are stored individually in these storage elements. The number of storage elements used may vary greatly depending upon the PRF and the length of storage time, but in the present embodiment there are 900 storage elements in each range matrix and therefore the return information from 900 transmitted radar pulses is constantly maintained in each matrix. This information is continuously being updated with the most recent return signal replacing the oldest stored signal so that the position of the latest information received progresses over the entire array of elements. The information in the storage elements is readout in a given order over and over and some means is required to synchronize the acceleration profiles of FIG. 3(a) so that each individual frequency sweep (over each period of $T_a$ seconds) begins with the readout of the oldest information and ends with the readout of the newest. This synchronization is carried out by programmer 250 in FIG. 2 and the synchronization operation will be understood more clearly by referring to FIG. 4.

Figure 4:
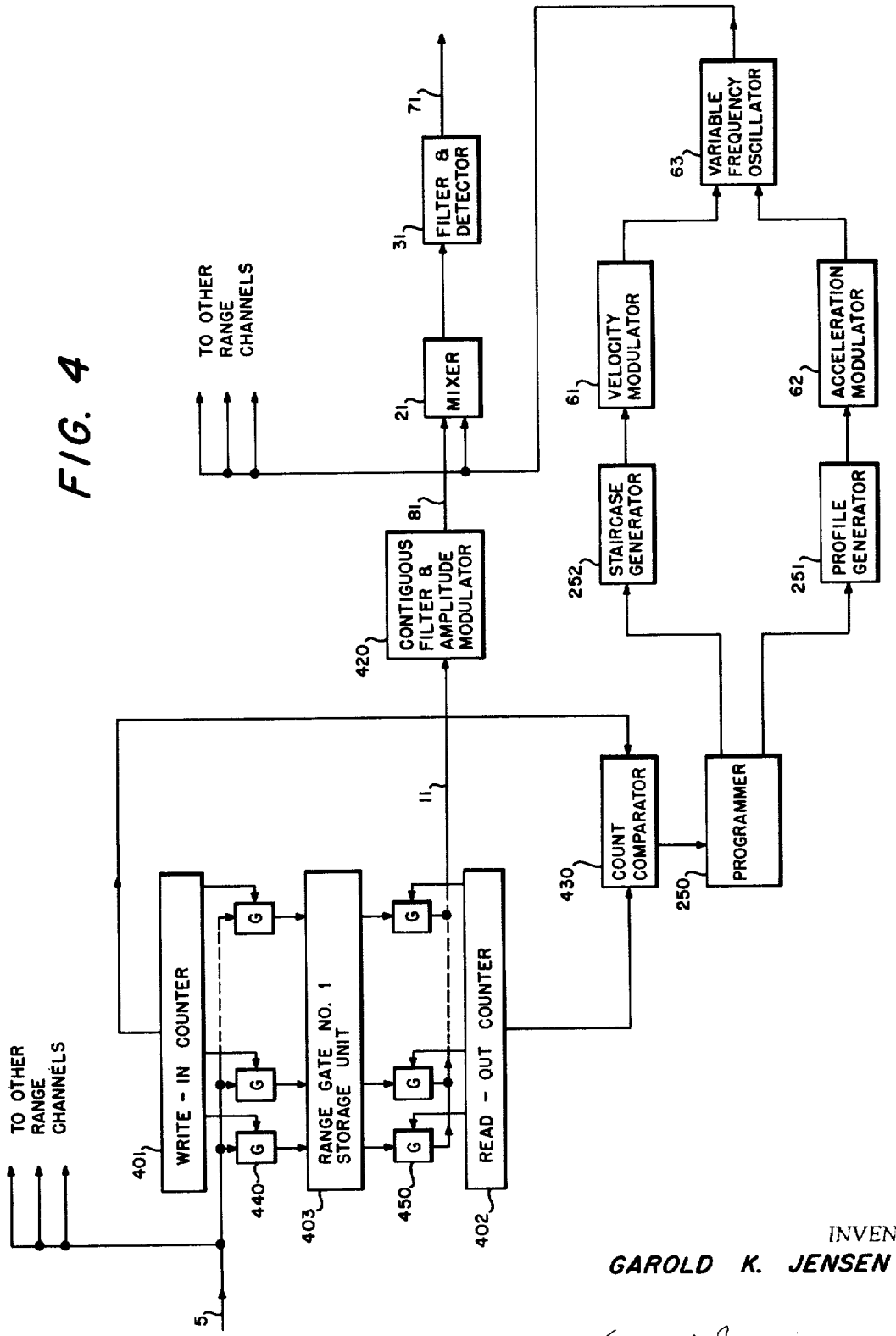
FIG. 4 shows one range channel including one range gate storage unit and one analyzing channel with the means for synchronizing the sweeps of the variable frequency oscillator.

FIG. 4 shows one range channel comprising storage unit 403 with its accompanying write-in and readout counters 401, 402 and also filter/modulator 420, mixer 21, and filter/detector 31. The video signals from the radar receiver appear on line 5 and write-in counter 401 acts as a strobing unit to sample the signal at the proper times corresponding to a given range and direct the samples to the appropriate storage elements in storage unit 403. A more detailed description of this sampling and storage operation is given in the above-mentioned patent application Ser. No. 649,791. FIG. 4 shows a plurality of gates, such as gate 440, which is in conjunction with write-in counter 401 act to steer the incoming signals to their proper storage locations. Counter 401 is shown as a single counter and the gates are shown as two-input devices, but is actuality all these units may be more complex circuits. For example, if the storage unit is a two-dimensional matrix of storage elements, write-in counter 401 could comprise two ring counters controlling the rows and columns of the matrix, and the gates could require simultaneous inputs from the two ring counters in order to pass the information signal to a particular storage element. In a similar manner readout counter 402 could comprise two ring counters and the readout gates such as gate 450 could be coincidence gating devices.

The readout rate is much higher than the write-in rate. For example, in the present embodiment with a PRF of 90 pulses per second and a storage time of ten seconds, a single range gate storage unit maintains 900 samples which are being written in at a rate of 90 samples per second while the readout of all 900 samples occurs each 120 microseconds resulting in a readout rate of 7.5 Mc/s.

The frequency of the amplitude envelope of these readout signals is the multiplied doppler frequency which varies with the instantaneous radial velocity of the target being detected. As explained above the multiplied doppler frequency is the original doppler frequency multiplied by the ratio of the write-in time over readout time. The doppler frequency is not constant for an accelerating target so that over a ten second period during which 900 return signals are being stored the doppler frequency will progress from one value to another and when the stored signals are readout read out multiplied doppler frequency sweeps across a range of values. Such a situation is illustrated in FIG. 3(b) which shows how the readout signal from an accelerating target varies in frequency. In order to analyze this information signal by comparing it with known frequency sweeps such as those shown in FIG. 3(a) it is necessary to synchronize the known sweeps so that the starts of their periods coincide with those of the information signal. To do this profile generator 251 must be triggered to start sweeping at just the instant when the oldest stored signal is being read out of the range gate storage unit. This triggering is accomplished by allowing the condition of the storage write-in circuits to control the start of each acceleration profile. It is possible to determine which storage element is presently being written into by observing the condition of write-in counter 401 in FIG. 4 and using this information to trigger profile generator 251 so that the frequency sweep of oscillator 63 begins when the oldest signal is being read out of the storage unit. Count comparator 430 continually compares the conditions of write-in and readout counters 401, 402 so that when their settings are equal it is known that the next following signal readout is the oldest stored signal available. This count equivalence is used to control programmer 250 which in turn controls staircase generator 252 and profile generator 251. Since the readout rate is much higher than the write-in rate, the stored signals are read out over and over while write-in counter 401 remains at one position.

Figure 5:
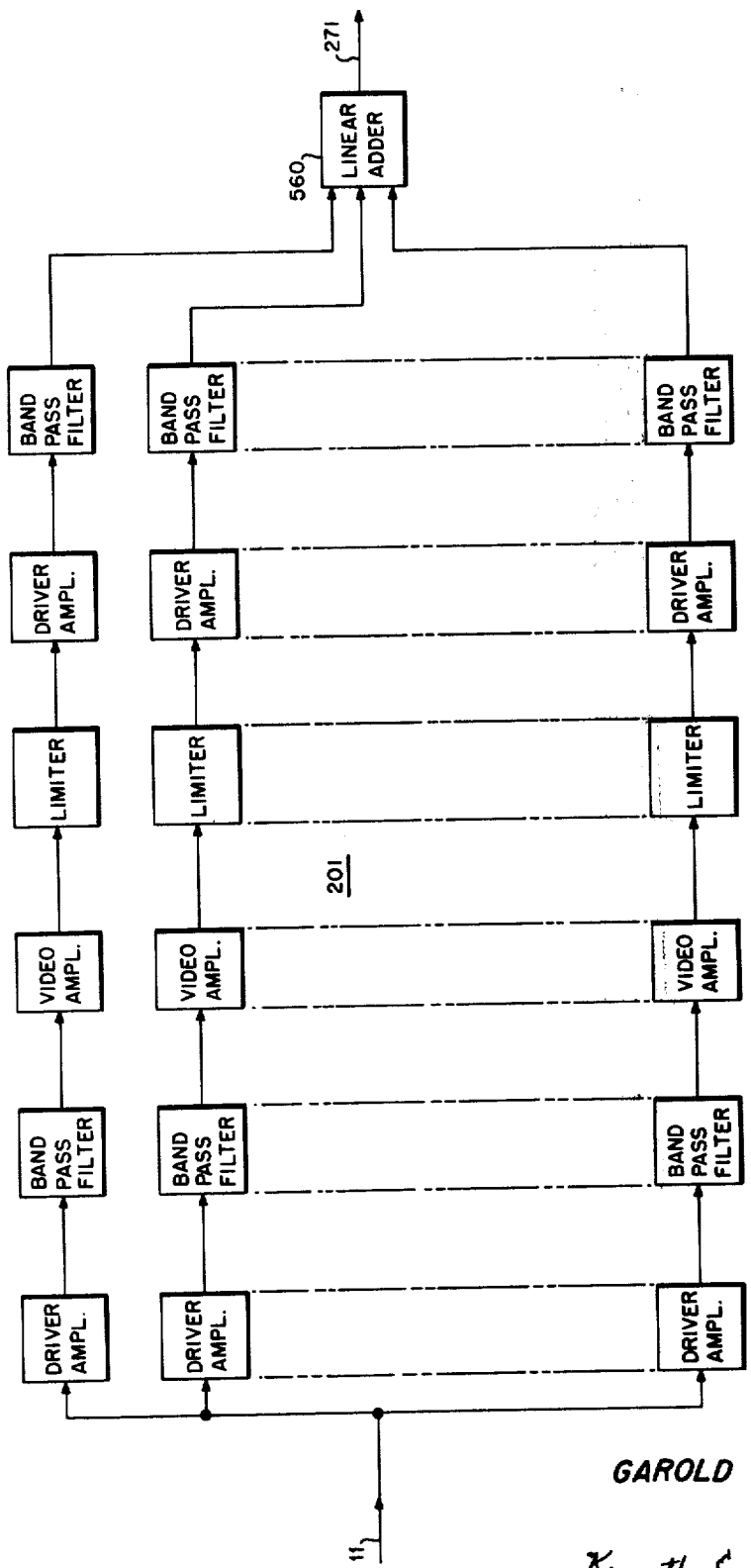
FIG. 5 shows a more detailed diagram of a contiguous filter used in the present system.

Contiguous filters 201, 202, 203, etc. in FIG. 2 are included to separate the doppler frequency span into a number of frequency bands so that a very large signal can not "capture" small signals existing elsewhere in the doppler band. One particular contiguous filter is shown in block diagram form in FIG. 5. A more complete description of this filter will be found in U.S. Pat. application Ser. No. 649,795 filed concurrently herewith by the present inventor in conjunction with James E. McGeogh. In FIG. 5 the single input is distributed to ten channels, each consisting of a driver amplifier, a band pass filter (BPF), a video amplifier, an amplitude limiter, a second BPF, and an output driver amplifier. The outputs of all channels are combined in adder stage 560. Each channel is provided with a video amplifier gain control and an output amplifier gain control.

One input level control and one output level control are provided for the entire set of channels.

Basically, the input BPF's of all channels are of equal bandwidths, with their passbands positioned immediately adjacent to one another in frequency and designed for a passband such that the composite total covers the entire input signal bandwidth. This bandwidth is determined by the product of the unambiguous doppler extent and the processing-time-compression-ratio of the single storage and readout system. The minimum detectable doppler frequency is limited to the cutoff frequency of the backscatter rejection filter, and the maximum unambiguous doppler frequency is limited to one-half of the pulse repetition frequency (PRF).

The input signal to the contiguous filter will always be accompanied by wideband noise plus any other interference. The wideband noise portion may be assumed to be distributed uniformly over the signal bandwidth so that the relative noise power level in each channel is equal to the total noise power divided by the number of contiguous filter channels. Thus, a 10-db reduction in total noise is obtained in a single channel when ten equal bandwidth channels are used. An input signal from a constant-velocity target will exist in only one of the contiguous filter channels and, prior to limiting, will not be reduced in amplitude; thus, the signal-to-noise ratio in that channel is improved by 10 db over that at the input.

Obviously many modifications and variations of the present invention are possible in the light of the above teachings. It is therefore to be understood that within the scope of the appended claims, the invention may be practiced otherwise than as specifically described.

What is claimed and desired to be secured by Letters Patent of the United States is:

1. In a moving target detection apparatus, a system for analyzing a sequence of signals whose amplitude envelope varies with the doppler information derived from a moving target, said system comprising:
    means to store said sequence of signals,
    means to repeatedly read out said stored signals during a plurality of equal duration readout intervals,
    means to produce a succession of analyzing signals each having a duration equal to one of said readout intervals,
    means to stepwise vary the frequencies of said succession of analyzing signals,
    means to continuously vary the frequencies of said succession of analyzing signals,
    means to mix said repeatedly readout signals with said succession of frequency signals; and
    filter means to receive the output from said mixer means and to pass a signal whenever the instantaneous frequency of the readout signals differs from the instantaneous frequency of the analyzing signals by a frequency which is passed by said filter.

2. The system of claim 1 wherein the means to continuously vary the frequencies of the analyzing signals comprises means to repeatedly sweep these frequencies at constant rates which vary from one readout interval to the next.

3. The system of claim 2 including means to synchronize the sweeps of the analyzing frequencies so that the beginning of each sweep coincides with readout of the oldest signal in said storing means.

4. The system of claim 1 including means to modulate the amplitude of said readout signals before said signals are mixed with said analyzing signals.

5. The system of claim 1 wherein the stored signals are read out at a rate higher then the rate at which they are stored.

6. The system of claim 1 wherein the means to produce analyzing signals comprises a variable frequency oscillator whose frequency varies in response to two voltage inputs.

7. In a moving target detection apparatus, a system for simultaneously analyzing a plurality of sequences of signals whose amplitude envelopes vary with the doppler information derived from moving targets at an equal plurality of range intervals, said system comprising:
    a plurality of storage means for separately storing said pluralities of sequences of signals,
    means for repetitively reading out said stored signals into a plurality of analyzing channels with each channel corresponding to a particular one of said plurality of range intervals.
    a variable frequency oscillator for generating a sequence of frequencies,
    a plurality of mixer means, one for each said analyzing channels, for simultaneously receiving the signals readout from said storage means,
    a plurality of filters, one for each said analyzing channels, for passing a predetermined range of frequencies, said pluralities of filters receiving the outputs of said plurality of mixer means for passing difference frequencies from said mixers whenever these difference frequencies fall within said predetermined range of frequencies.

8. The system of claim 7 wherein the frequency of the variable frequency oscillator is held constant during certain complete readouts of said stored signals and varies continuously during other complete readouts of said stored signals.

9. The system of claim 7 including two sources of variable input voltage connected to said variable frequency oscillator to vary the frequency thereof.

10. The system of claim 9 wherein the first of said two sources of variable input voltage is a staircase generator.

11. The system of claim 10 wherein the second of said two sources of variable input voltage is a sawtooth generator.

* * * * *